United States Patent

Nakagaki et al.

[11] Patent Number: 5,852,474
[45] Date of Patent: Dec. 22, 1998

[54] TELEVISION RECEIVER INCLUDING PLAYBACK MODE FOR STORING SCREEN IMAGE INFORMATION FOR PREDETERMINED TIME TO REPRODUCE AND ITS METHOD

[75] Inventors: Nobufumi Nakagaki, Tokyo; Takeshi Minemoto, Sagamihara; Takeshi Hoshino, Kodaira; Masahide Aoki, Iruma; Atsushi Ishibashi, Kokubunji, all of Japan

[73] Assignee: Hitachi, Ltd., Tokyo, Japan

[21] Appl. No.: 698,560

[22] Filed: Aug. 15, 1996

[30] Foreign Application Priority Data

Aug. 24, 1995 [JP] Japan ................................ 7-216321

[51] Int. Cl.⁶ .............................. H04N 5/445; H04N 5/45
[52] U.S. Cl. ..................... 348/564; 348/565; 348/567; 348/568; 348/569
[58] Field of Search .................................. 348/564, 565, 348/566, 567, 568, 569, 586, 588; H04N 5/445, 5/45, 9/74

[56] References Cited

U.S. PATENT DOCUMENTS 4,972,264  11/1990  Bishop .

FOREIGN PATENT DOCUMENTS 1166679A  6/1989  Japan .

Primary Examiner—Sherrie Hsia
Attorney, Agent, or Firm—Kenyon & Kenyon

[57] ABSTRACT

In a television receiver and a display method thereof, the television receiver includes a video signal processing circuit for receiving a video signal, converting the signal into a video display signal, and outputting the signal therefrom; a video signal storage circuit for receiving the video display signal from the processing circuit, recording the signal for a predetermined period of time, writing the video display signal in an overwriting manner after lapse of the predetermined period of time, and repeating the recording operation at an interval of the predetermined period of time; a switch circuit for receiving the video display signals from the video signal processing and storage circuits, combining the signals with each other in a switching fashion, and outputting a resultant signal therefrom; a control circuit for controlling the video signal storage circuit and switch circuit in response to an indication signal supplied from an external device, combining with each other the video display signals from either one or both of the video signal storage circuit and switch circuit, and outputting an obtained signal therefrom, and a display circuit for displaying thereon the video display signal outputted from the switch circuit.

15 Claims, 14 Drawing Sheets

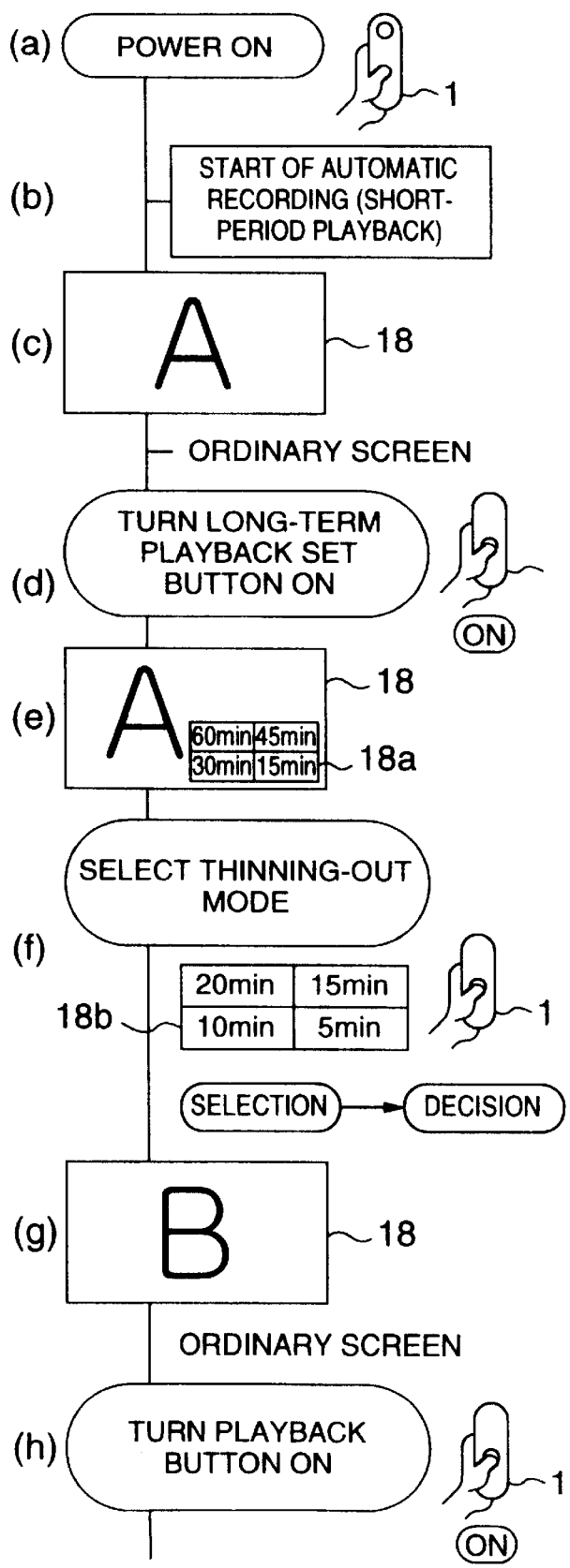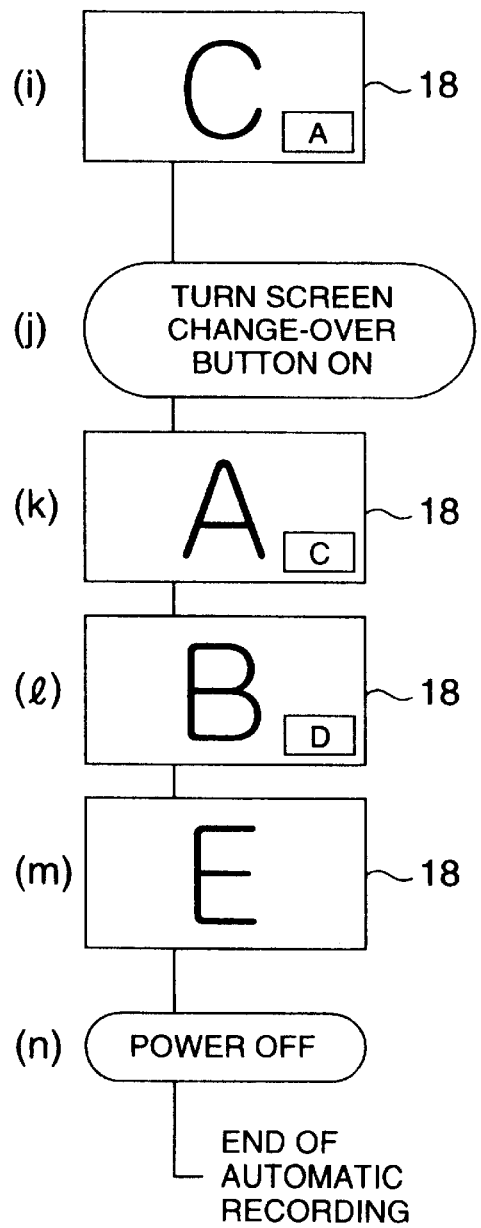
FIG. 6

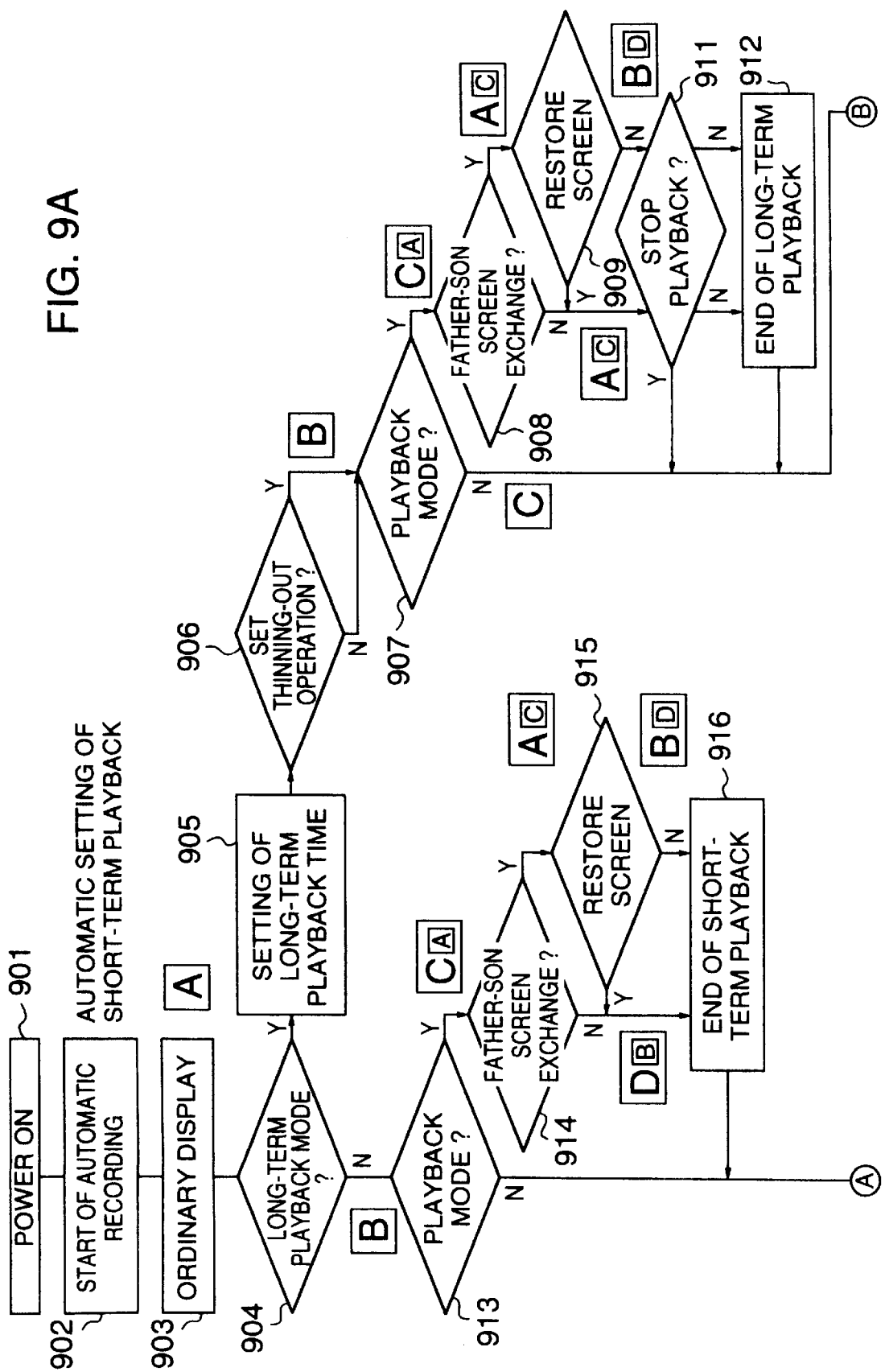

FIG. 10A
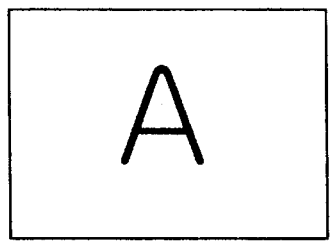
FIG. 10B
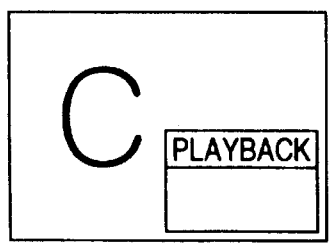
FIG. 10C
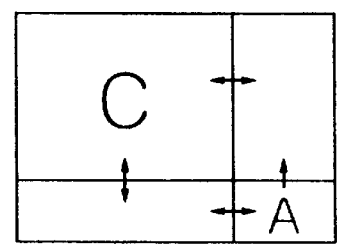
FIG. 10D
FIG. 11A
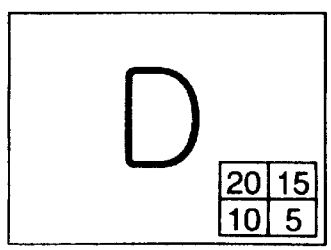
FIG. 11B
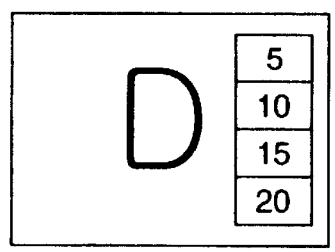
FIG. 11C
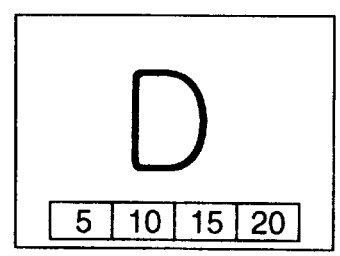

LONG-TERM PLAYBACK, TIME-SHIFT MODE

TELEVISION RECEIVER INCLUDING PLAYBACK MODE FOR STORING SCREEN IMAGE INFORMATION FOR PREDETERMINED TIME TO REPRODUCE AND ITS METHOD

BACKGROUND OF THE INVENTION

The present invention relates to a television receiver and a display method of the same in which a screen image of a broadcasted television program can be displayed again in a repeated manner.

When enjoying a television program, there may occurs a case in which the viewer for an instant misses some scenes for some reasons or the viewer cannot watch the program for a short period of time because he or she is required to leave his or her seat for a short period of time. According to the prior art, when it is desired to view again any scenes missed during a television program, there has been used a method in which the viewer begins recording the television program by a video tape recorder (VTR) when the program is started or when the viewer leaves the seat.

In the method, the required scenes can be displayed again by playing the recorded program after the television program is finished. However, in such a case in which the viewer watches the missed scenes after the program is completed, the interest of the viewer has already decreased or destroyed. Namely, it is naturally required that the desired scenes are displayed while the pertinent program is being televised.

In contrast thereto, according to the technology described in the JP-A-1-166679 by the present inventor, there is provided a semiconductor memory in a television receiver to store therein video signals corresponding to a television program broadcasting period ranging from about two minutes to about three minutes. While conducting a refreshing operation, video signals of a received television program are sequentially memorized in the memory such that scenes of the program televized in the last two to three minutes are continuously stored therein in a periodic fashion. When required, the stored video signals are obtained, in response to a predetermined operation, from the semiconductor memory for the playback thereof. The reproduced scenes are presented in a subordinate screen disposed in the display screen for the ordinary television program of the television set.

In accordance with the conventional technology, since the pictures of the signals attained from the semiconductor memory can be presented in a subordinate screen on the screen of the television receiver, the memorized scenes can be acquired from the memory for the play thereof even when a desired program is being broadcasted. That is, the television viewer can again watch the missed scene of the program.

However, according to the prior art above, the video signals written in the semiconductor memory correspond to the fixed period of time determined by the storage capacity of the memory. Consequently, it is impossibly to play again, for example, program scenes missed because the viewer left his or her seat for a period of time, namely, scenes missed in an arbitrary period of time. Moreover, it is not practically convenient to entirely watch program scenes broadcasted for a long period of time, e.g., 20 or 30 minutes.

SUMMARY OF THE INVENTION

It is therefore an object of the present invention to provide a television receiver and a display method thereof in which an arbitrary scene of a television program being broadcasted can be selectively displayed, thereby solving the problem above.

In order to achieve the object according to the present invention, the television receiver includes a delay circuit to sequentially keep therein scenes of a television program received by the television set such that in response to an indication from an operator thereof, the program scenes are read from the delay circuit to be presented on the screen as the delayed screen images of the program.

Timing to read signals from the delay circuit varies depending on the instruction of the operator. Therefore, according to the instruction, a scene televised in the program in the past is decided and is read from the delay circuit for the reproduction thereof. As a result, there are displayed again the scenes broadcasted in the desired period of time. In consequence, scenes missed for a moment for some reasons and scenes missed because the viewer left the seat can be again watched even during the broadcasting period of the pertinent program.

BRIEF DESCRIPTION OF THE DRAWINGS

These and other objects and advantages of the present invention will become apparent by reference to the following description and accompanying drawings wherein:

FIG. 6 is a diagram showing a concrete example of a sequence of screen images displayed in a long-term playback mode in the embodiment of FIG. 1;

FIGS. 9A and 9B are a flowchart showing operations in the short-term and long-term playback modes as well as those in the short-term and long-term time-shift modes in the embodiment of FIG. 1;

FIGS. 10A to 10D are diagrams showing specific examples of screen images displayed in the playback mode;

FIGS. 11A to 11C are diagrams showing concrete examples of selection screens for the playback time;

DESCRIPTION OF THE PREFERRED EMBODIMENTS

Referring now to the accompanying drawings, description will be given of an embodiment according to the present invention.

Figure 1:
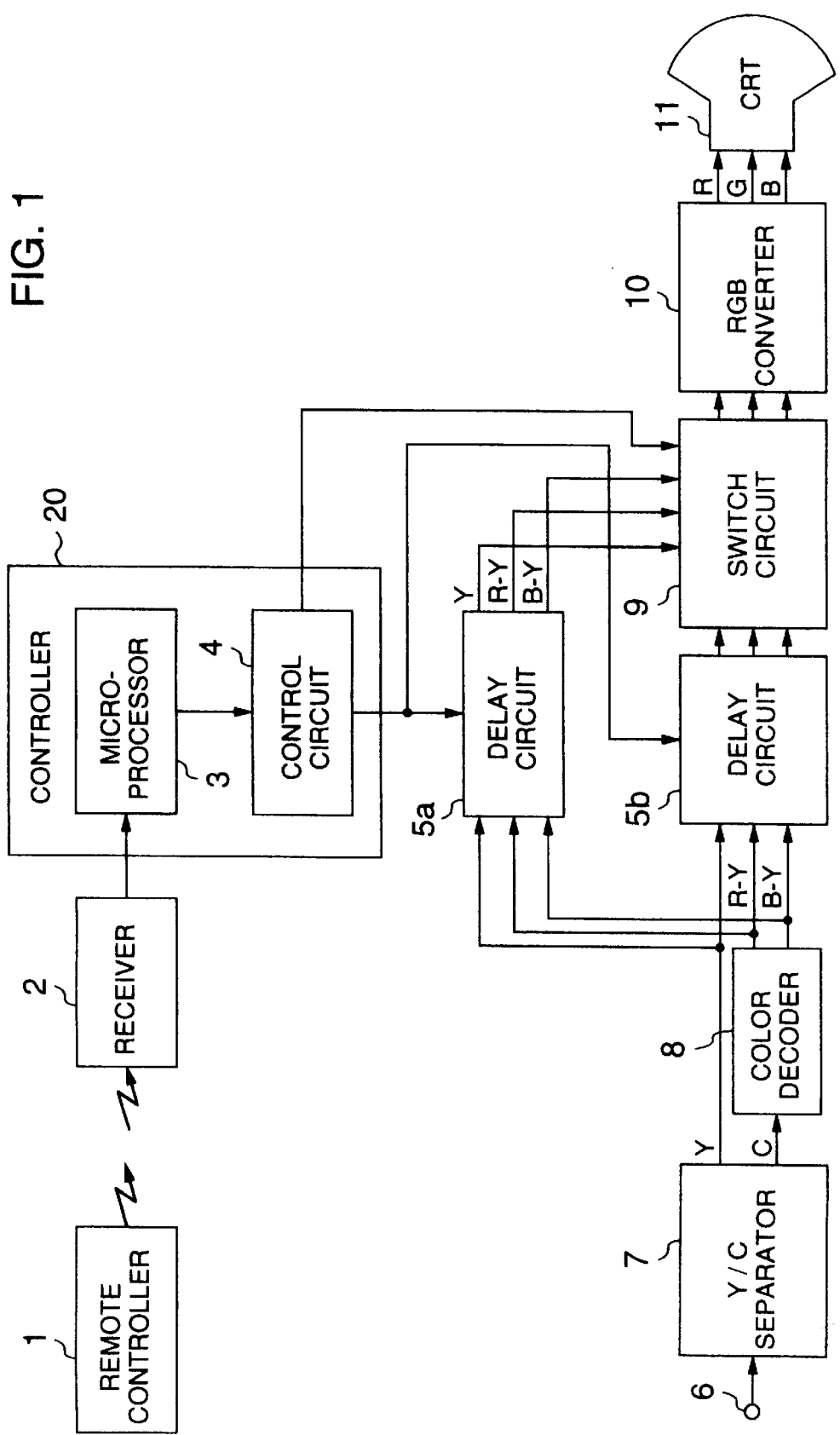
FIG. 1 is a block diagram showing the configuration of an embodiment of the television receiver and its display method according to the present invention.

FIG. 1 shows in a block diagram the primary portion of an embodiment of the television receiver and its display method according to the present invention. The configuration of FIG. 1 includes a remote controller 1, a signal receive 2, a microprocessor 3, a control circuit 4, delay circuits 5a and 5b, an input terminal 6, a luminance (Y)/chrominance (C) separator circuit 7, a color decoder circuit 8, a switch circuit 9, a red (R), green (G), and blue (B) converter circuit 10, a cathode-ray tube (CRT) 11, and a control unit 20 including the microprocessor 3 and control circuit 4.

In FIG. 1, signals of a television program of a cable television broadcast system and/or the ordinary television broadcast system are received such that color video signals of the received program are inputted from the input terminal 6 to be fed to the Y/C separator 7. The signals are then separated into a luminance signal Y and a chrominance signal C. The signal C is further supplied to the color decoder 8 to be decoded into color difference signals R - Y and B - Y. The luminance signal Y and color difference signals R - Y and B - Y are stored in the delay circuit 5b and then are inputted via the switch circuit 9 to the RGB converter 10 to be converted into primary color signals R, G, and B. The color signals are fed to the CRT 11 such that the color video signals inputted from the input terminal 6 are displayed as a color picture on the CRT 11.

Additionally, The luminance signal Y and color difference signals R - Y and B - Y are sent to the delay circuit 5a including a semiconductor memory. When the television receiver is powered and a desired television program is started to be received, the delay circuit 5a automatically initiates a write operation to sequentially store therein the luminance signal Y and color difference signals R - Y and B - Y.

When the operator conducts a play operation by the remote controller 1, a play instruction is accordingly received by the receiver 2 and is then fed to the microprocessor 3 to be decoded therein. According to a result of the decode operation, the control circuit 4 achieves a control operation to read the luminance signal Y and color difference signals R - Y and B - Y from the delay circuit 5a in the play mode specified by the remote controller 1 and controls the switch circuit 9. Resultantly, the luminance signal Y and color difference signals R - Y and B - Y attained from the delay circuit 5a are combined by the switch circuit 9 with a signal outputted from the delay circuit 5b to be delivered to the RGB converter 10. The signal is then converted into the primary color signals R, G, and B to be then sent to the CRT 11. As a result, a color picture is displayed on the screen of the CRT 11 according to the luminance signal Y and color difference signals R - Y and B - Y obtained from the delay circuit 5a.

On the display screen of the CRT 11, pictures of signals acquired from the delay circuits 5a and 5b are presented in a method using a subordinate display area disposed at a predetermined position of the main screen area (picture-in-picture (PinP) display) or in a method using a subordinate display area disposed outside the main screen area (picture-out-picture (PoutP) display). In these systems, either one of the screens is designated as the primary or father screen and the remaining one thereof is assumed as the subordinate or son screen. However, the father-son relationship may be reversed by the control circuit 4, namely, the circuit 4 can issue control instructions to the delay circuits 5a and 5b and switch circuit 9 to reverse the relationship.

In the delay circuit 5b, the luminance signal Y and color difference signals R - Y and B - Y supplied thereto are written in the overall storage area thereof. When the stored picture is presented as the main screen image on the display screen or only the memorized picture is displayed on the screen, the signals thereof are read from the delay circuit 5b without any delay time, namely, with delay time set to 0. When the stored picture is presented as the subordinate screen image on the screen, the picture is minimized in size while being read therefrom at timing related to the display position of the picture on the display screen. The read control operation is accomplished by the control circuit 4.

Figure 2:
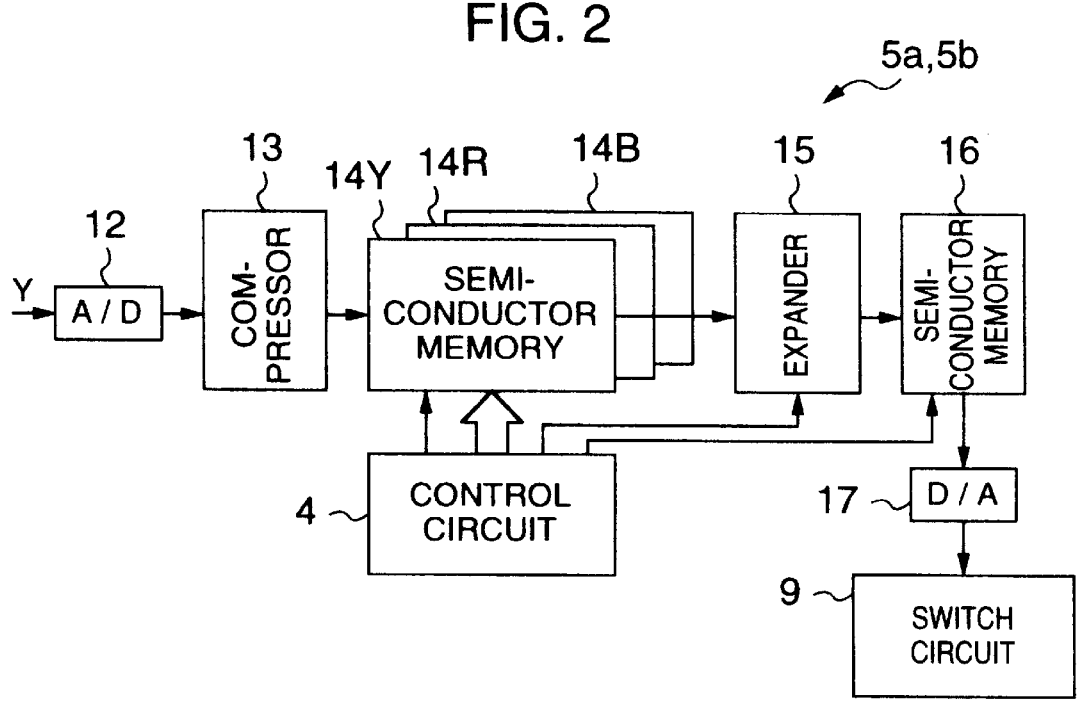
FIG. 2 is a block diagram showing a concrete example of a delay circuit of the embodiment of FIG. 1.

FIG. 2 is a block diagram specifically showing an example of the structure of the delay circuit 5a of FIG. 1 in which a reference numeral 12 indicates an analog-to-digital (A/D) converter, numeral 13 denotes a picture compressor circuit, numerals 14Y, 14R, and 14B stand for semiconductor memories, numeral 15 represents a picture expander circuit, numeral 16 indicates a semiconductor memory, and numeral 17 designates a digital-to-analog (D/A) converter. The constituent components corresponding to those of FIG. 1 are assigned with the same reference numerals.

In this diagram, a luminance signal Y from the Y/C separator 7 of FIG. 1 is converted by the A/D converter 12 into a digital signal and is subjected in the picture compressor 13 to a picture compression to be resultantly stored in the semiconductor memory 14Y. Similarly, the color difference signals R - Y and B - Y from the color decoder 8 of FIG. 1 are written in the memories 14R and 14B, respectively. On receiving signals of a broadcasted television program, the control circuit 4 starts the write operations of the memories 14Y, 14R, and 14B such that the control circuit 4 sequentially sends write addresses thereto to sequentially store signals in the respective areas. Incidentally, the delay circuits 5a and 5b are of the same configuration.

When a play operation is indicated from the remote controller (FIG. 1) as described above, the control circuit 4 activates the memories 14Y, 14R, and 14B to accomplish read operations according to the indication such that the luminance signal undergone the picture compression and obtained from the memory 14Y is expanded by the picture expander 15 to be temporarily stored in the memory 16. Thereafter, the luminance signal is converted through the D/A converter 17 into an analog luminance signal and is then delivered to the switch circuit 9. This also applies to the color difference signals R - Y and B - Y read from the memories 14Y, 14R, and 14B.

Naturally, when the signals are displayed in a vertical display screen together with a picture read from the delay circuit 5b of FIG. 1 according to the picture in picture display method, the picture is minimized in size in the memory 16.

Figure 3A:
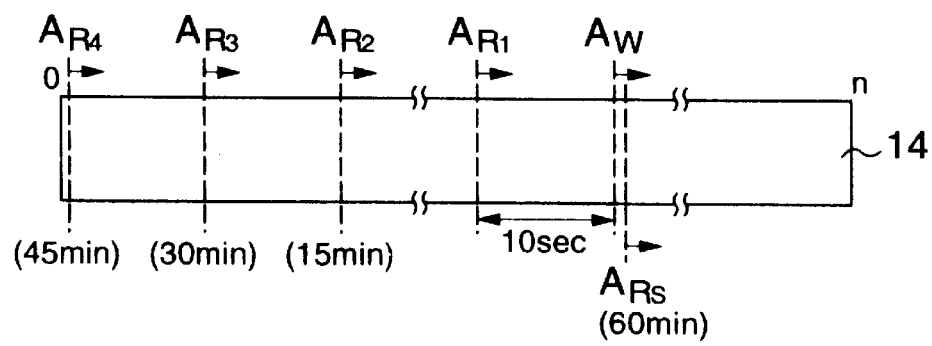
FIGS. 3A and 3B are diagrams schematically showing a relationship between write and read addresses of a semiconductor memory of the delay circuit of FIG. 2.
Figure 3B:
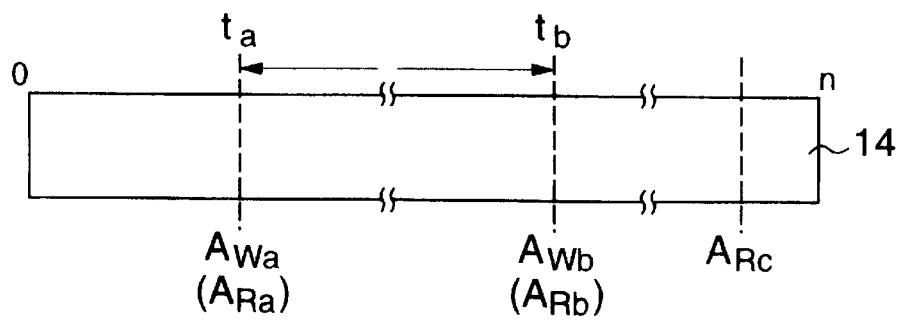

FIGS. 3A and 3B are schematic diagrams showing a relationship between write and read addresses in the semiconductor memory 14 including the memories 14Y, 14R, and 14B shown in FIG. 2.

In FIG. 3A, assume that about 60-minute compressed pictures can be stored in the memory 14 and $A_w$ indicates a write address. The address $A_w$ is shifted in the arrow direction according to the lapse of time so that picture data of video signals thus compressed is sequentially written at the write address. When the address $A_w$ is equal to the last address n, the value of $A_w$ is cleared to 0 to thereby start the write operation beginning at address 0 such that the picture data is written in an area in which the previous data is written at least 60 minutes before.

About ten minutes after the setting of address $A_w$, a first read address $A_{R1}$ is established by the control circuit 4. Similarly, a second read address $A_{R2}$ is designated when about 15 minutes lapse after the setting of $A_w$, a third read address $A_{R3}$ is designated about 30 minutes after the setting of $A_w$, a fourth read address $A_{R4}$ is set when about 45 minutes lapse after the setting of $A_w$, and a fifth read address $A_{R4}$ is set about 60 minutes after the setting of $A_w$ by the control circuit 4. Either one of the first to fifth read addresses is chosen by the play operation on the remote controller (FIG. 1).

According to the embodiment, the picture signal can be reproduced with a desired delay time in a relatively simple circuit construction. This is also applicable to voices only by increasing the memory capacity for voice signals according to the same principle. The circuit configuration is simple also in this case. Moreover, as described above, the write address need only be sequentially increased or decreased such that when the write address is equal to the predetermined limit value n, it is only necessary to reset the value of the write address to zero.

On the other hand, the read address is obtained by converting the desired delay time into a shift time of the write address, namely, the number of addresses on the basis of the write cycle so as to decide the read address by delaying the address according to the number of addresses.

As above, pictures and voices can be reproduced by setting an arbitrary delay time for the view of the desired pictures.

When the function is used in a family, although the delay time may be arbitrarily set, it will be favorable to preset representative delay time values in advance so that any family member selects a desired delay time value through a simple operation.

When it takes a long period of time to play again a scene of an exciting moment during a sport program, for example, a homer scene of a baseball program or a goal scene of a football program, the viewer will be irritated. In this situation, it is favorable that the period of time necessary to start the play of the desired scene is in a range from five seconds to 15 seconds. In the embodiment above, the time is set to ten seconds (in the short-period playback mode, which will be described later).

Assume in the following paragraphs that the play mode in which the picture signals are read according to specification of the first to fifth read addresses is called a playback mode, the play mode using the first read address $A_{R1}$ is denoted as a short-term playback mode, and the playback mode employing the addresses ranging from the second read address $A_{R2}$ to the fifth read address $A_{R5}$ is designated as a long-term playback mode. When either one of these playback modes is selected, the read operation is carried out in an area ranging from the indicated read address $A_{R1}, \ldots,$ or $A_{R5}$ to the write address $A_w$ being specified at the pertinent point of time. For example, assume that the playback mode using the first address $A_{R1}$ is designated at the current point of time t and the write address at the point t is $A_w$. On this occasion, the read operation is accomplished in a region ranging from the first read address $A_{R1}$ to the address $A_w$ beginning at the point of time t.

In the long-term playback mode, video data is read from the memory at a read speed other than the data write speed thereof. Namely, in the operation to read a predetermined number of frames (or fields) of video data from the memory 14, the number of frames (or fields) actually read for the subsequent process is less than that of the frames (or fields) in the memory 14. That is, the frames (or fields) are thinned out for a fast review to minimize the video data read time for mitigation of the load of observation time for the operator.

Additionally, there can be implemented a review mode according to an instruction from the remote controller (FIG. 1). As shown in FIG. 3B, the write address $A_w$a at the current point of time ta is set to the first read address $A_R$a and the write address $A_w$b at a point of time tb which is an arbitrary period of time after the point of time ta is set to the second read address $A_R$b so that the read operation in a zone ranging from the first read address $A_R$a to the second read address $A_R$b is achieved beginning at the point of time tb. This playback mode will be called a time-shift mode herebelow.

Also in the time-shift mode, the review operation can be executed with the read speed set to the write speed or the operation can be achieved using the thinning-out function like in the long-term playback mode to minimize the data read time. The former is efficiently adopted when the read area is small and is referred to as a short-term time-shift mode herebelow. The latter is effective for a large read area and is called a long-term time-shift mode herebelow.

For example, in a situation in which a viewer is watching a television program, when the time-shift function is initiated because of a telephone call, a visitor, or something else to do, the video pictures and voices of the program are stored in the semiconductor memory 14 beginning at the point of time. For example, when the time-shift function is activated at the point ta in FIG. 3B, the time-shift mode is effective beginning at the point ta.

The pictures and voices of the program are continuously written in the memory 14 with the television receiver powered as described in conjunction with FIG. 3A. The write address $A_w$a at the point ta when the time function is invoked is kept as the read start address ($A_R$a) by the control circuit 4. In consequence, when the time-shift mode is set at the point ta, the pictures and voices of the program after the point of time are sequentially stored in the memory 14 beginning at the address $A_R$a.

When the viewer is free again to re-start watching the program (at the point tb), if any play operation is conducted, the time-shift playback mode is assumed. The pictures and voices of the program thus recorded in the memory 14 up to the playback point tb are then sequentially read from the area ranging from the address $A_R$a to the address $A_R$b, thereby displaying the reproduced picture.

In this operation, the playback scenes are presented in the picture-in-picture or picture-out-picture mode together with those of the ordinary program not delayed. Therefore, all scenes of the entire program are guaranteed even when there occurs something to do while the viewer is watching the program.

In the method above, the television program is continuously memorized. However, in consideration only of the time-shift function, there may be employed a method in which the program memorizing operation is initiated when the mode is set.

Figure 4:
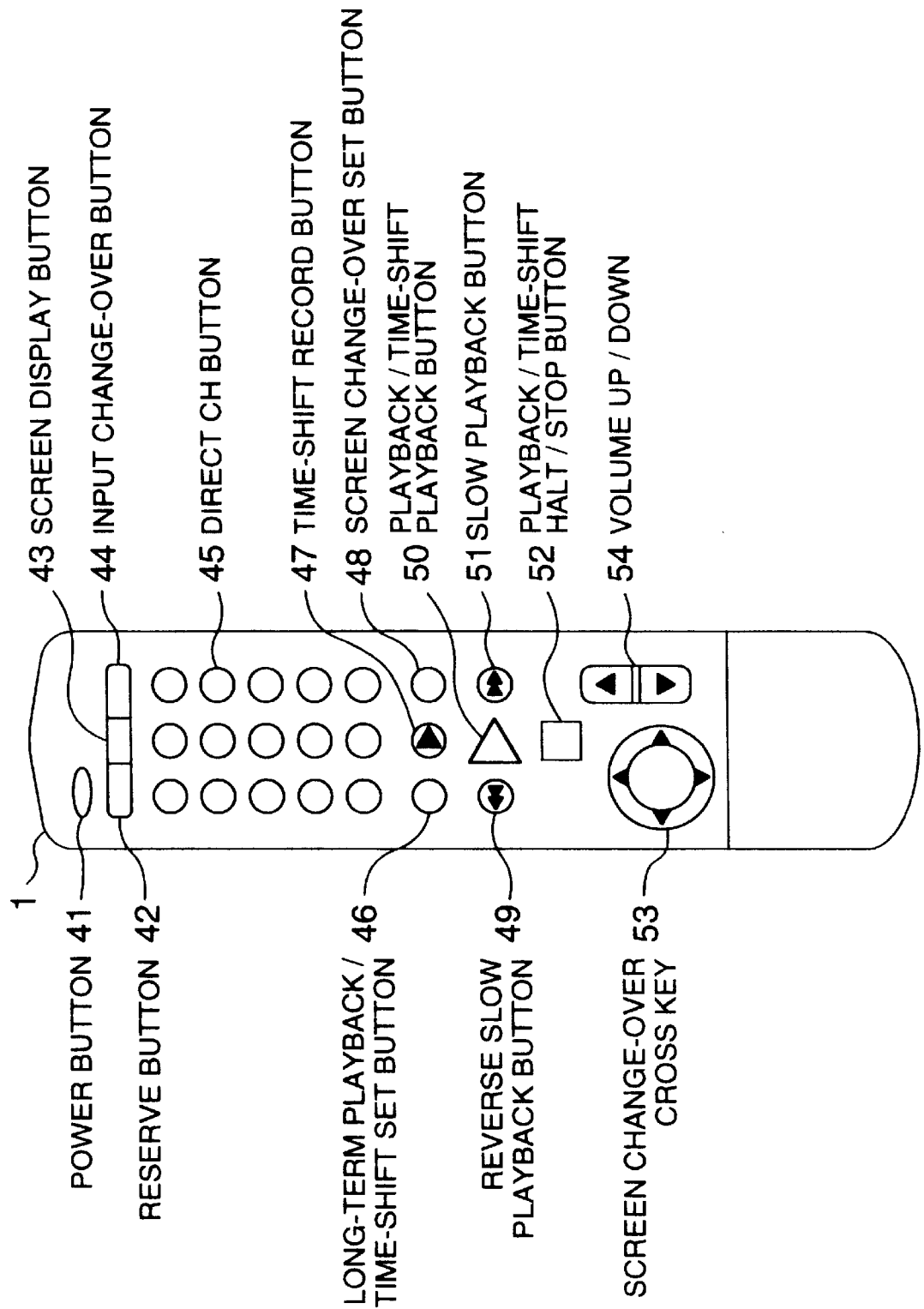
FIG. 4 is a plan view showing a specific example of an operator's unit of a remote controller shown in the embodiment of FIG. 1.

FIG. 4 shows in a plan view a specific example of the operator's unit of the remote controller 1 of FIG. 1.

In the diagram, a time-shift record button 47 is used to instruct the initiation of the program recording in the time-shift mode. Namely, the button 47 is employed to set the first read address ARa indicating the read start address of FIG. 3B.

A playback/time-shift playback button 50 initiates the playback operation in the short-term playback mode when the time-shift record button 47 is non-active. On the other hand, the button 50 starts the review in the short-term time-shift mode when the time-shift record button 47 is active. With the record button 47 kept in the non-active state, when the playback button 50 is depressed, the picture signal read operation is carried out in an area ranging from the address $A_{R1}$ to the address $A_w$ (which is an address assumed when the playback button 50 is operated) shown in FIG. 3A. When the playback button 50 is depressed after the record button 47 is operated, the signal read operation is accomplished in an area ranging from the write address $A_w a$ corresponding to the depression of the record button 47 to the write address $A_w$ associated with the operation of the playback button 50.

A long-term playback/time-shift set button 46 is provided to set the long-term playback or time-shift mode related to the thinning-out operation. With the time-shift record button 47 kept in the non-active state, the button 46 initiates the playback operation in the long-term playback mode. When the record button 47 is operated, the button 46 activates the review in the long-term time-shift mode.

A playback/time-shift halt/stop button 52 is adopted to temporarily halt or to stop the operation in the playback or time-shift mode.

The operator's control 1 further includes a screen change-over cross key or cursor button 53. A picture of video signals reproduced from the semiconductor memory 14 is displayed on the CRT 11 (FIG. 1) together with the picture of the received video signal of the television program in the picture-in-picture mode, which will be described later. When the key 53 is operated, the father-son relationship between the playback picture and the ordinary broadcast picture is exchanged.

Additionally, a slow playback button 51 is disposed to conduct the slow review of pictures in the playback or time-shift mode, whereas a reverse slow playback button 49 is utilized to achieve the slow playback in the reverse direction.

The other buttons and keys are the same as those provided in the remote controller for use with the ordinary television receivers such as, power button 41, reverse button 42, screen display button 43, input change-over button 44, direct ch button 45, screen change-over set button 48 and volume up/down button 54

Next, the operations modes above will be described.

Figure 5:
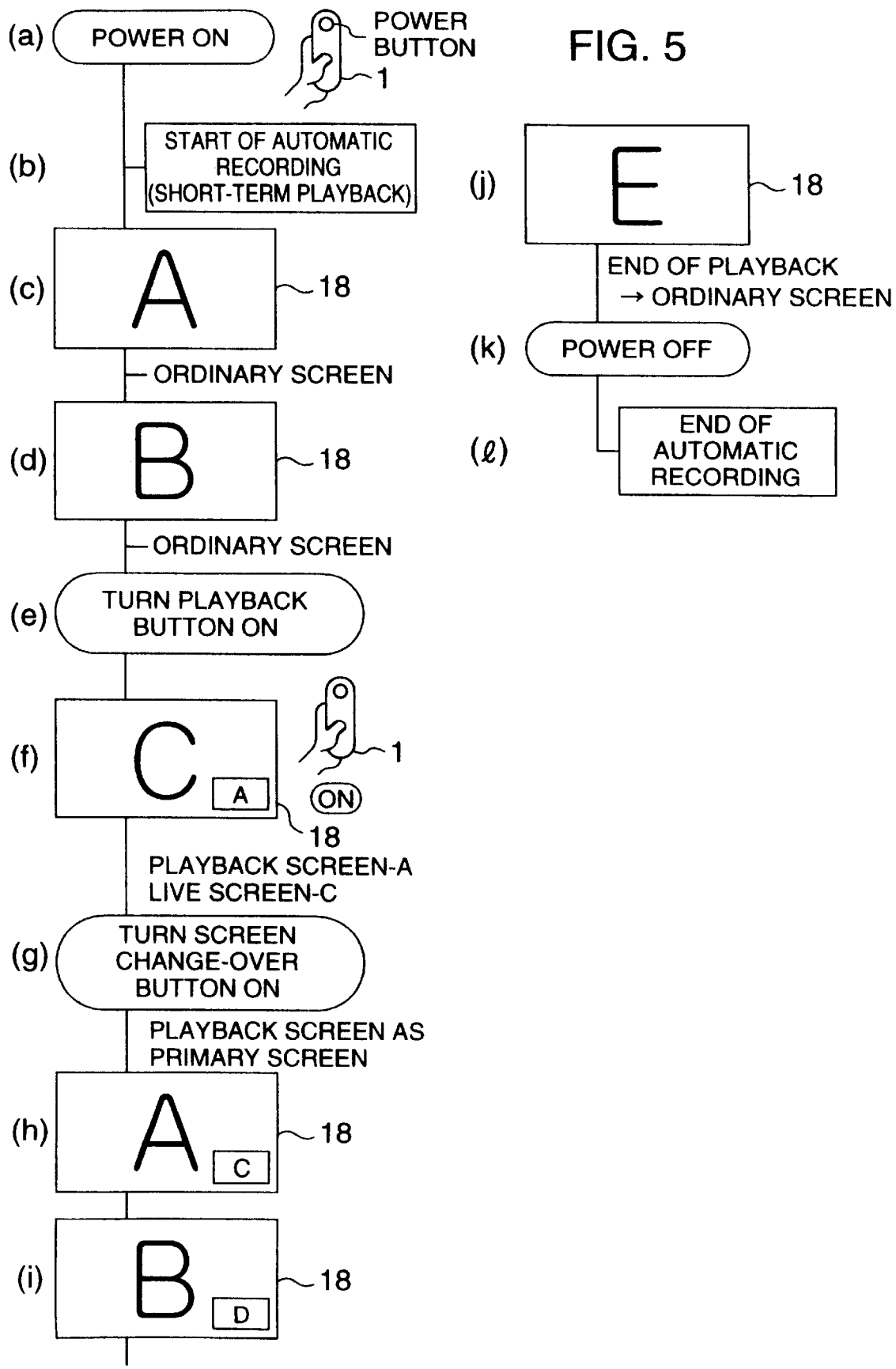
FIG. 5 is a diagram showing a concrete example of a sequence of screen images displayed in a short-term playback mode in the embodiment of FIG. 1.

FIG. 5 shows a sequence of screen images displayed in the short-term playback mode.

When the power switch (FIG. 4) is turned on (FIG. 5(a)), the ordinary program scene is displayed and the picture recording operation is started in the semiconductor memory 14 of the delay circuit 5a as described above (FIG. 5(b)). Scenes A and B of the television program are then sequentially presented on the display screen 18 of the CRT 11 (FIG. 1) as respectively shown in (c) and (d) of FIG. 5. Moreover, these scenes are also written in the memory 14. When the playback/time-shift playback button (FIG. 4) is depressed as shown in (e) of FIG. 5 in this display state, the short-term playback mode is established in the system.

Assume now that the previously displayed scenes "A" and "B" are stored as ten-second picture data in an area ranging from the first read address $A_{R1}$ of FIG. 3(a) to the write address $A_w$ when the short-term playback mode is set. Displayed on the screen 18 are, as shown in FIG. 5(f), the scene "C" of the running television program as the primary screen image and the first playback scene, i.e., playback image "A" as the subordinate screen image in the picture-in-picture or picture-out-picture mode. In short, the primary and secondary screen images are simultaneously displayed.

When the screen change-over button (FIG. 4) is operated as shown in (g) of FIG. 5 to check the playback picture, the screen change-over or switch operation is carried out such that the playback image "A" and the scene "C" of the ordinary program are presented respectively in the primary and subordinate screens in the picture-in-picture mode as shown in (h) of FIG. 5. When the last playback picture "B" and a scene "D" of the program are displayed in the picture-in-picture mode (FIG. 5(i)) and the short-term playback mode is finished or the playback/time-shift stop button (FIG. 4) is depressed, the screen state is automatically changed to present only a scene "E" of the live program on the screen (FIG. 5(j)).

When the power switch (FIG. 4) is set to OFF (FIG. 5(k)), the ordinary screen display is turned off and the automatic record operation is also automatically terminated (FIG. 5(l)).

FIG. 6 shows a sequence of screens displayed in the long-term playback mode.

When the power switch (FIG. 4) is turned on (FIG. 6(a)), the recording operation is commenced in the semiconductor memory 14 as described above (FIG. 6(b)). Thereafter a scene "A" of the live program is displayed on the screen 18 of the CRT 11 (FIG. 1) as shown in FIG. 6(c); furthermore, the scene "A" is also recorded in the memory 14.

When the long-term playback/time-shift set button (FIG. 4) is once depressed in the display state (FIG. 6(d)), a screen 18a is presented on the screen 18 to select the playback time as shown in FIG. 6(e). When one of the selection items is indicated by operating the cross key (FIG. 4), a screen 18b is displayed on the screen 18 to select a period of time for the review of the picture related to the selected playback time as shown in FIG. 6(f). Either one of the selection items is then similarly chosen by the cross key.

When the playback/time-shift playback button is operated (FIG. 6(h)), a picture ranging from a scene "A" of FIG. 6(c) to a scene "B" of FIG. 6(g) corresponding to the point of time of depression of the button is assumed as the playback picture such that the live pictures "C" to "D" of the current program as well as the playback pictures "A" and "B" are presented in the screen 18 of the CRT 11 in the picture-in-picture mode as shown in FIGS. 6(i) to 6(l). During the operation above, when the screen change-over button (FIG. 4) is depressed (FIG. 6(j)), the father-son relationship of the primary and subordinate screens is exchanged between the images "C" and "D" and the playback images "A" and "B".

When the playback picture is completely reviewed for the specified period of time or when the playback/time-shift stop button (FIG. 4) is depressed, the long-term playback mode is terminated and only the picture of the ordinary program is displayed on the screen (FIG. 6(m)). Thereafter, when the power switch (FIG. 4) is set to OFF (FIG. 6(n)), the power is turned off and the automatic recording operation is finished.

Assume in the long-term playback mode that "60 min" is selected in the screen image 18a shown in FIG. 6(e) and "10 min" is chosen in the screen image 18b of FIG. 6(f). A 60-minute picture stored in the storage 5a (FIG. 1) is reproduced as the playback picture to be reviewed in ten minutes according to a fast review mode. That is, the 60-minute image is compressed with respect to time to the 10-minute picture to be reviewed in the fast playback mode.

The operation will be described by referring to FIG. 3A. An address $A_{R5}$ is set as the read start address and the current write address $A_w$ is assumed as the read end address such that the read operation is conducted in the storage area ranging from the address $A_{R5}$ to the address $A_w$ at a read speed which is six times the write speed. The video signals read at the high speed are expanded by the picture expander 15 of FIG. 2 such that every sixth frame (or field) is extracted therefrom through the thinning-out operation to be written in the memory 16. In the memory 16, the video signals are subjected to a time-axis conversion. The signals are then read therefrom at timing suitable for the picture-in-picture display mode and are then converted by the D/A converter 17 into analog video signals to be fed to the composition switch circuit 9.

As above, to attain a 60-minute playback picture, when the read start address is set to $A_{R5}$ and the display periods of playback picture are specified as 20, 15, 10, and 5 minutes, the video signals of the 60-minute playback picture is compressed with respect to time respectively to ⅓, ¼, ⅙, and ½ the original volume thereof through the thinning-out playback process.

Similarly, when the playback time is set to 45, 30, and 15 minutes in the screen 18a of FIG. 6(e), the read start address is respectively set to $A_{R4}$, $A_{R3}$, and $A_{R2}$ of FIG. 3(a) such that the signal volume compression is carried out with respect time according to the display period (20, 15, 10, or 5 minutes) in the thinning-out playback operation. In this connection, for example, it is not acceptable that the display time is longer than the playback time, for example, the playback time is set as 15 minutes and the display time is specified as 20 minutes.

Incidentally, the read start addresses $A_{R1}$, $A_{R2}$, $A_{R3}$, $A_{R4}$, and $A_{R5}$ may be obtained by address counters respectively provided in the control circuit 4. However, there may be used only one address counter. When the playback mode is specified, the addresses $A_{R1}$, $A_{R2}$, $A_{R3}$, $A_{R4}$, or $A_{R5}$ obtained according to the write address is set as the initial value to the counter. In addition, the signal read speed of the semiconductor memory 14 can be decided in each playback mode by altering the clock frequency of the address counter.

Figure 7:
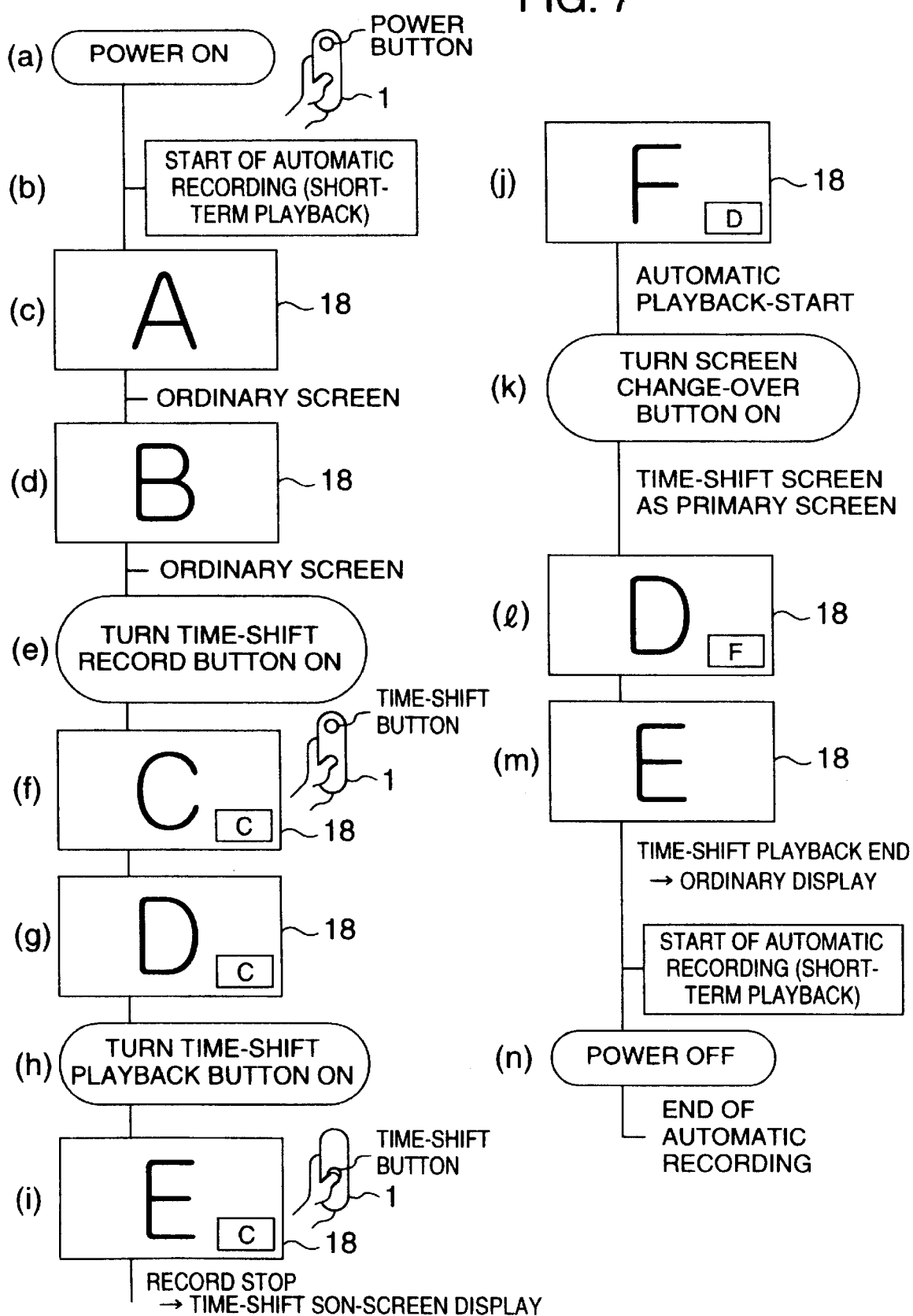
FIG. 7 is a diagram showing a concrete example of a sequence of screen images displayed in a short-term time-shift mode in the embodiment of FIG. 1.

FIG. 7 shows a flow of screen images presented in the short-term time-shift mode.

When the power button (FIG. 4) is depressed (FIG. 7(a)), the picture recording is initiated in the semiconductor memory 14 as described above (FIG. 7(b)). Thereafter, scenes "A" and "B" of the current television program are displayed on the screen 18 as shown in FIGS. 7(C) and 7(d) and are then recorded in the memory 14.

When the time-shift record button (FIG. 4) is depressed in this situation (FIG. 7(e)), the write address $A_wa$ of the memory 14 at this point is set as the read start address $A_Ra$ as described in relation to FIG. 3(b) and then a scene "C" at the pertinent point of time is displayed as a still picture "C" in the subordinate display screen (FIG. 7(f)).

With this state kept retained, when a certain period of time lapses after a scene "D" of the program is displayed as the primary screen image and the still picture "C" is presented as the subordinate screen image as shown in FIG. (g), if the playback/time-shift playback button (FIG. 4) is operated (FIG. 7(h)), a playback operation is conducted for the pictures "C" and "D" stored in the memory 14 during the period from when the time-shift record button is shifted in FIG. 7(e) to when the playback/time-shift playback button is operated in FIG. 7(h). That is, as described in conjunction with FIG. 3(b), the write address $A_wb$ of the memory 14 at the point of time is set as the read end address $A_Rb$ such that the pictures stored in the area ranging from the read start address $A_Ra$ to the read end address $A_Rb$ are subjected to the playback operation. The obtained pictures are displayed together with the video images "E" and "F" of the television program in the picture-in-picture display mode as shown in (i), (j), (k) and (l) in FIG. 7.

During the operation above, when the screen change-over button (FIG. 4) is depressed (FIG. 7(k)), the picture "F" of the program and the playback scene "D" reproduced from the signals stored in the memory 14 are presented in the subordinate and primary screens, respectively.

When the playback is completely achieved for the area of the memory 14 or when the playback/time-shift stop button (FIG. 4) is depressed (FIG. 7(n)), the short-period time-shift mode is terminated and then only the scene "E" of the current program is displayed on the screen (FIG. 7(m)). Thereafter, when the power switch (FIG. 4) is activated, the power supply is turned off and the automatic recording is terminated.

Figure 8:
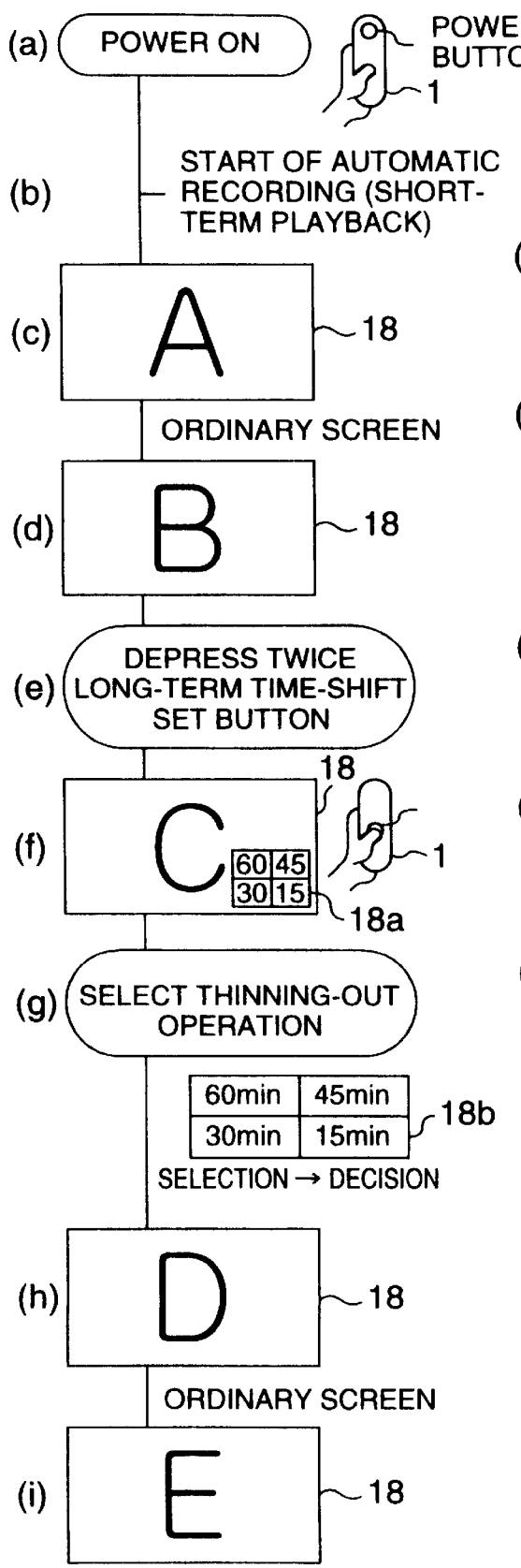
FIG. 8 is a diagram showing a concrete example of a sequence of screen images displayed in a long-term time-shift mode in the embodiment of FIG. 1.

FIG. 8 shows a sequence of screen images displayed in the long-term time-shift mode.

This mode is adopted, for example, to watch again a television program beforehand received.

When the power button (FIG. 4) is turned on (FIG. 8(a)), the picture recording is commenced in the semiconductor memory 14 as described above (FIG. 8(b)). Scenes "A" and "B" of the current television program are then presented on the display screen 18 of the CRT 11 (FIG. 1) as shown in (c) and (d) of FIG. 8 and are also stored in the memory 14.

In this display state, when the long-term playback/time-shift set button (FIG. 4) is depressed twice (FIG. 8(e)), a screen image 18a is displayed on the screen 18 for the operator to select the time-shift value (i.e. playback time) as shown in FIG. 8(f). When one of the selection items is chosen in the screen image 18a by the cross key (FIG. 4), there is presented a screen image 18b as shown in FIG. 8(g) to select the period of time for the display of the time-shift picture beforehand selected. In response thereto, either one of the selection items is then designated similarly by the cross key.

When the selection is completely accomplished, the write address $A_wa$ at the current point of time ta is set as the read start address $A_RA$ in the memory 14. According thereto, an address apart therefrom the time-shift period of time selected in FIG. 8(f) is set as the read end address $A_Rc$. For example, when the selected time-shift period is 45 minutes, there are stored 45-minute video signals in an area of the memory 14, the area ranging from the decided read start address $A_Ra$ to the read end address $A_Rc$. Thereafter, pictures "D" and "E" of the television program are displayed as shown in (h) and (i) of FIG. 8. Additionally, since the video signal write operation is being continuously executed in the memory 14, the video signals of the pictures "D" and "E" are written therein beginning at the read start address $A_Ra$.

After this point, when the playback/time-shift playback button (FIG. 4) is depressed (FIG. 8(j)), the signals are read from the memory area ranging from the read start address $A_Ra$ to the read end address $A_Rc$ of FIG. 3(b) in the period of time selected in FIG. 8(g) such that the time-shift scenes "D" and "E" thus reproduced are displayed in the picture-in-picture display mode as shown in (k) to (n) of FIG. 8. During the operation, when the screen change-over button (FIG. 4) is depressed (FIG. 8(*l*)), the relationship of father and son screens is exchanged or reversed.

In this connection, for example, when the time-shift period and the display period are set equally to 60 minutes, namely, when an equal value is designated for the time-shift period and display period, the pictures recorded in the memory 14 are directly reviewed in the playback operation. However, for example, when the time-shift period is set to 60 minutes and the display period is denoted as 30 minutes, that is, when the pictures corresponding to the time-shift period are reviewed in a display period less than the time-shift period, there is accomplished the fast review like in the long-term playback mode in which the fast read operation is conducted to obtain the video signals from the memory through the thinning-out process.

When the playback process of video signals of the time-shift period is completely achieved, or when the playback/time-shift halt/stop button (FIG. 4) is depressed, there is restored the state in which only the scene of the television program is displayed on the screen. Thereafter, when the power switch (FIG. 4) is depressed, the power source is turned off and the automatic recording is terminated (FIG. 8(*o*)).

Figure 9B:
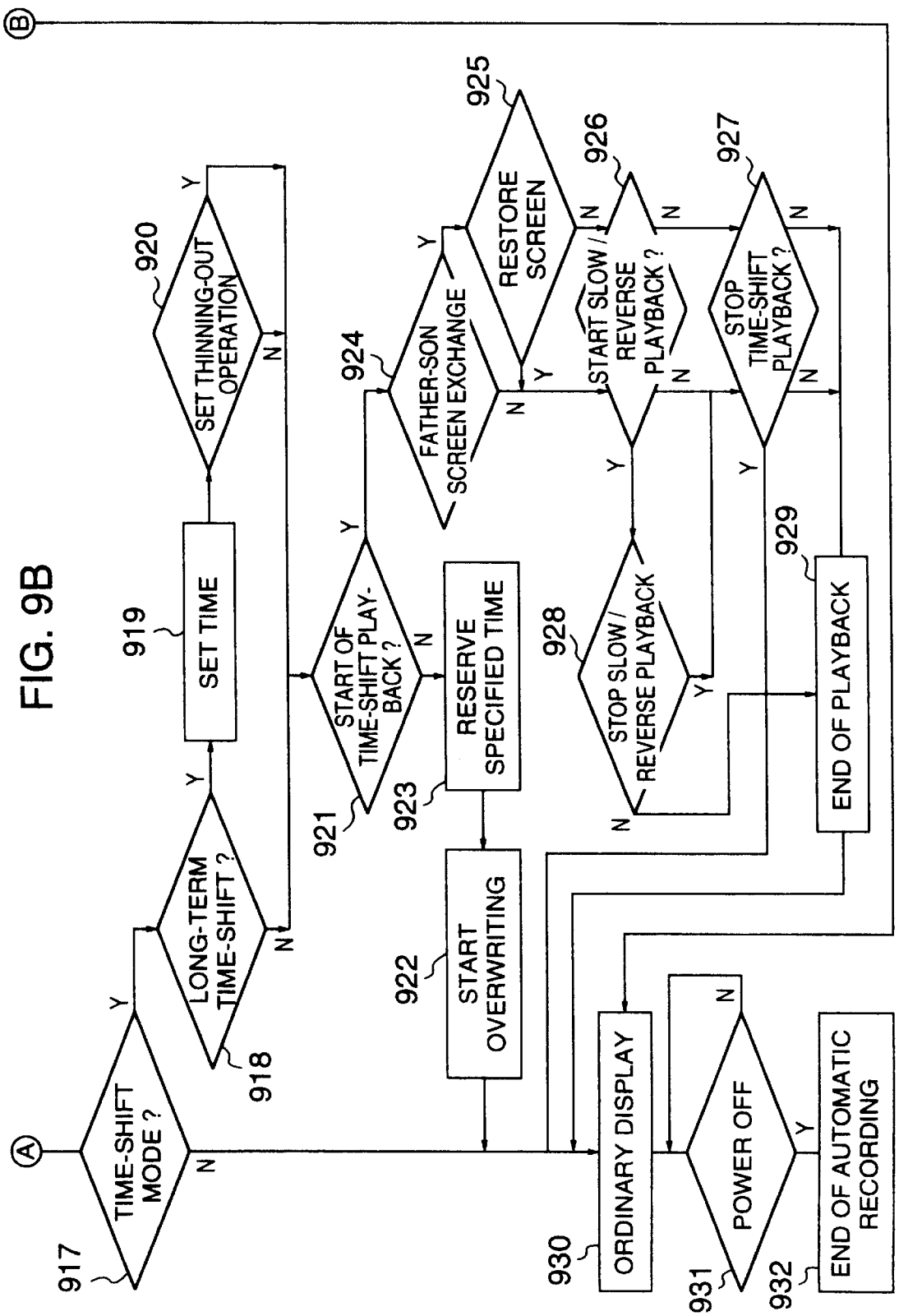

FIGS. 9A and 9B are a flowchart showing the operation described above.

In the flowchart, the upper-half portion is elated to the playback mode, whereas the left-hand and right-hand sections thereof show operations respectively of the short-term and long-term playback modes. Moreover, the lower-half portion of FIGS. 9A and 9B are associated with the time-shift mode in which the left-hand and right-hand sections are related respectively to the short-term and long-term playback modes.

Referring now to the flowchart of FIGS. 9A and 9B, description will be given of operations of the delay circuits 5*a* and 5*b* in the playback and time-shift modes.

Once the system is powered (step 901), the video signal supplied from the input terminal is processed respectively by the Y/C separator 7 and color decoder 8 to be fed to the delay circuit 5*a* such that the resultant signals are automatically stored under control of the controller 4 via the A/D converter 12 and compressor circuit 13 in the semiconductor memories 14Y, 14R, and 14B, thereby starting the automatic recording process (step 902). In this operation, an address AR1 which is ten seconds preceding the current write address Aw is automatically set as the read address in the short-term playback mode as shown in FIG. 3A.

In concurrence with the operation of the delay circuit 5*a*, the video signals written in the delay circuit 5*b* are read therefrom without any delay time to be 25 fed via the switch circuit 9 and RGB converter 10 an are then ordinarily displayed on the CRT 11 (step 903).

When it is desired to set the system to the long-period playback mode in this situation (step 904), a desired playback period of time is set as the read start address AR2, AR3, AR4, or AR5 as shown in FIG. 6(*e*) (Step 905). Moreover, if necessary, a thinning-out period of time is specified as shown in FIG. 6(*f*) (step 906).

When the playback operation is initiated at this point (step 907), the video signals are read from the semiconductor memories 14Y, 14R, and 14B at the respective read start addresses corresponding to the specified delay time at the designated thinning-out rate so as to resultantly display the obtained picture in the subordinate screen disposed in the primary screen according to the fast review mode.

To specifically observe the playback screen image, it is also possible to exchange the primary and subordinate screens with each other (step 908). Furthermore, it is also possible to restore the ordinary screen image when necessary (step 909). When the playback time specified in the long-term playback mode is terminated (step 912), there is displayed the ordinary scene of the television program. However, it may naturally possible to stop the playback mode (step 911) at an intermediate point so as to restore the ordinary display image.

Additionally, when the playback operation is carried out (step 913) without designating the long-term playback mode (step 904), the short-term playback is achieved such that the playback scenes are displayed in the subordinate screen of the primary screen beginning at a point of time preceding ten seconds the current point in this embodiment.

Also in the short-period playback mode, the father-son screen exchange (step 914) or the screen restoration (step 915) can be accomplished like in the long-period playback mode. When the ten-second short-term playback is terminated (step 916), the ordinary television scene is displayed on the screen.

Moreover, after the selection is made for the time-shift mode (step 917) and long-term shift mode (step 918), when the time-shift period shown in FIG. 8(*f*) is set (step 919) for the playback period in the thinning-out operation (step 920), the current write address is assumed as the read start address to start the write operation for the specified period of time in the memories 14Y, 14R, and 14B.

After the specified period of time is terminated for the write operation, when the time-shift playback is initiated (step 921), each of these memories are accessed under control of the control circuit 4 to read the stored picture signals from an area ranging from the specified write address to an address corresponding to termination of the specified period of time according to the designated thinning-out rate such that the scenes are displayed in the fast review mode on the subordinate screen arranged in the primary screen.

The father-son relationship between the primary and subordinate screen can be changed or restored when required (step 924); moreover, the slow/reverse playback can be arbitrarily set (step 926) or stopped (step 928) for the long-term time-shift picture. When the playback period of the long-term time-shift picture is too long and the playback operation becomes unnecessary, it is possible to stop the time-shift playback (step 927). When the playback is completely finished (step 929), only the primary screen is restored to the ordinary display state (step 930).

In addition, when the short-term time-shift is denoted (N in step 918), the current address is memorized as the playback start address by the controller 4. At initiation of the time-shift playback (step 921), the short-term time-shift playback is carried out beginning at the specified address. Also in the short-term time-shift playback mode, the exchange between the primary and subordinate screens (steps 924 and 925), slow/reverse playback and termination thereof (steps 926 and 928), and the time-shift interruption (step 927) can be accomplished in the same fashion as for the long-term time-shift process.

Furthermore, also in the short-period and long-period time-shift operations, if the playback is not indicated in the decision step for time-shift initiation (step 921), when the specified period of time lapses (step 923) thereafter, picture signals are additionally written (step 922) in the memories 14Y, 14R, and 14B.

When the power is turned off (step 931) in the ordinary display state (step 930), the automatic recording operation is also terminated (step 932) in the memories 14Y, 14R, and 14B.

Incidentally, in association with the operation above, the playback of voice signals may also be achieved. Namely, there is provided means for storing therein voice signals for the picture recorded in the delay circuit 5a through the automatic recording process such that the voice signals are simultaneously reproduced for the display in the short-term playback or time-shift mode. In this case, it is favorable to hear the voice of the voice signals by one of the stereophonic channels by using, for example, an earphone. Or, since the playback is usually conducted in a short period of time, the voice may be preferentially sounded before the voice of the pertinent picture of the television program.

FIGS. 10A to 10D shows a specific example of a display sequence in the playback mode.

FIG. 10C is related to the picture-in-picture display mode described above including a playback picture in the subordinate screen. In this display method, the father-son relationship may be changed between the primary and subordinate screens by the screen change-over button (FIG. 4) as above.

In FIG. 10A, only the playback image is presented in the overall display screen, which can be implemented by providing the screen change-over button with a function to select either one of the playback picture or the screen image of the television program.

FIG. 10B shows an example in which the entire screen is equally subdivided into two zones respectively for the live screen image of the program and the playback picture. In this method, when the playback picture review is started, the obtained image is displayed as shown in this example. It is to be understood that only the screen image of the television program is displayed when the playback stop button is depressed.

In FIG. 10D, the display area sizes of the live screen image and the playback picture are arbitrarily decided. Namely, the remote controller 1 has a function to set the area size ratio such that the picture signal read method is controlled for the delay circuit 5b and semiconductor memory 16 of FIG. 1.

Additionally, FIGS. 11A to 11C show concrete examples of displaying the selection screen 18a for playback time in FIG. 6(e) and the selection screen 18b for display time in FIG. 6(f). In FIGS. 11A to 11C, the time values are respectively arranged in the lower-right corner, on the right-hand side, and in the bottom of the screen.

The display methods of FIGS. 10A to 10D and FIGS. 11A to 11C are shown only by way of examples, however, the invention is not restricted by these display methods.

Incidentally, in these specific examples, particularly, in the short-term playback mode, when the playback operation is once accomplished, the pertinent scene cannot be reviewed again. However, in the configuration of FIG. 2, the playback of the pertinent scene is possibly conducted under control of the control circuit 4 as follows. When the playback and display is achieved using the semiconductor memory 14, the read start and end addresses of the memory 14 are memorized by the controller 4. When a playback instruction issued by the user from the remote controller 1 (FIG. 1) is received, the controller 4 achieves a control operation to carry out the playback operation for the area (playback signal storage area) ranging from the read start address to the read end address. As a result, the scene once reviewed can be displayed again as a playback image. In this situation, when the memory 14 includes any memorized picture, the data of the playback area which is set in the short-term playback mode and which is beforehand stored in the controller 4 is specified in response to the instruction from the remote controller 1 such that the playback process is conducted for the playback area of the memory 14 according to the specified data.

Figure 12A:
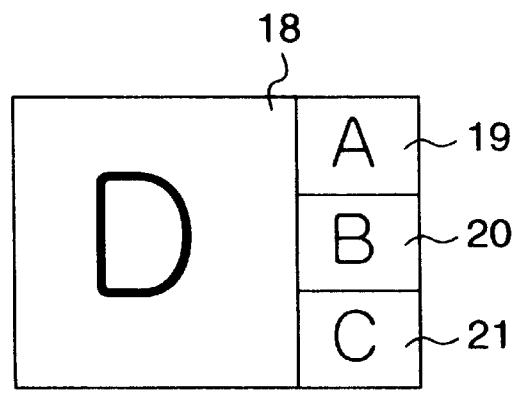
FIGS. 12A to 12C are diagrams showing another method of displaying playback pictures.
Figure 12B:
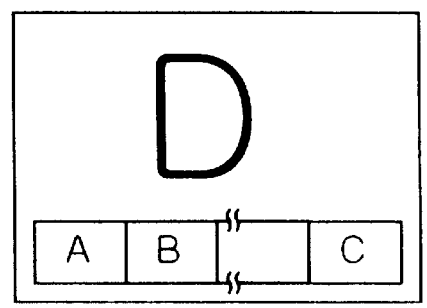
Figure 12C:
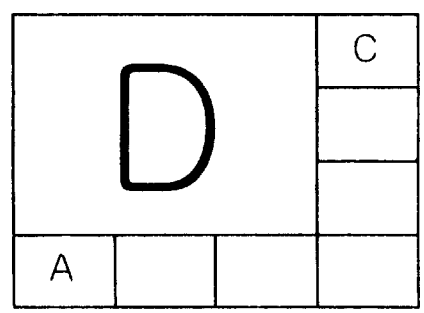

FIGS. 12A to 12C show examples of the method of displaying the playback picture reproduced from the playback signal area described above.

In FIG. 12A, the playback images accumulated in the respective playback areas in the short-term playback mode are vertically presented in the right-hand side of the display screen 18. Specifically, the playback images are arranged in the ascending generation order in the display zones 19 to 21. Although not shown in FIG. 4, there is provided an appropriate button or key such that when the key is depressed, a playback image of another playback area is presented in the zone 21, the image previously being displayed in the zone 21 is displayed in the zone 20 thereover, and the previous image of the zone 20 is displayed in the zone 19 thereover. Resultantly, the old playback picture displayed in the zone 19 is concealed. Namely, the playback images of the playback areas can be displayed in the scrolling display manner.

Moreover, the picture ("D" in this case) is presented in the remaining screen area. However, when the cross key is operated to specify either one of the display zones 19 to 21, the playback picture of the specified zone is presented in the primary screen. Furthermore, it is also possible to display the picture of the television program in the specified display zone.

In the situation, although the playback images displayed in the zones 19 to 21 are mobile pictures, these images may also be still pictures. When the image is displayed in the primary screen, there is presented the mobile picture thereof.

FIG. 12B shows an example in which the playback pictures attained from the playback areas are horizontally displayed in the bottom of the display screen 18, whereas FIG. 12C is an example in which the display zones are disposed in the bottom and on the right-hand side of the screen 18. In these cases, there can be provided the function described in conjunction with FIG. 12A.

In this regard, although the playback image of the memory 14 can be reviewed again in the configuration of FIG. 2, there may be provided another semiconductor memory such that the first playback picture is stored in the additional memory so that the second review of the playback image is achieved using the memory.

Moreover, FIGS. 12A to 12C show examples related to the short-term playback mode. However, it may also be possible to specify points of, for example, respectively five minutes, three minutes, and one minute preceding the current point of time in the semiconductor memory 14 such that a mobile or still picture is reproduced from the memory 14 beginning at each specified point of time, thereby displaying the playback images as described in relation to FIGS. 12A to 12C.

Figure 13:
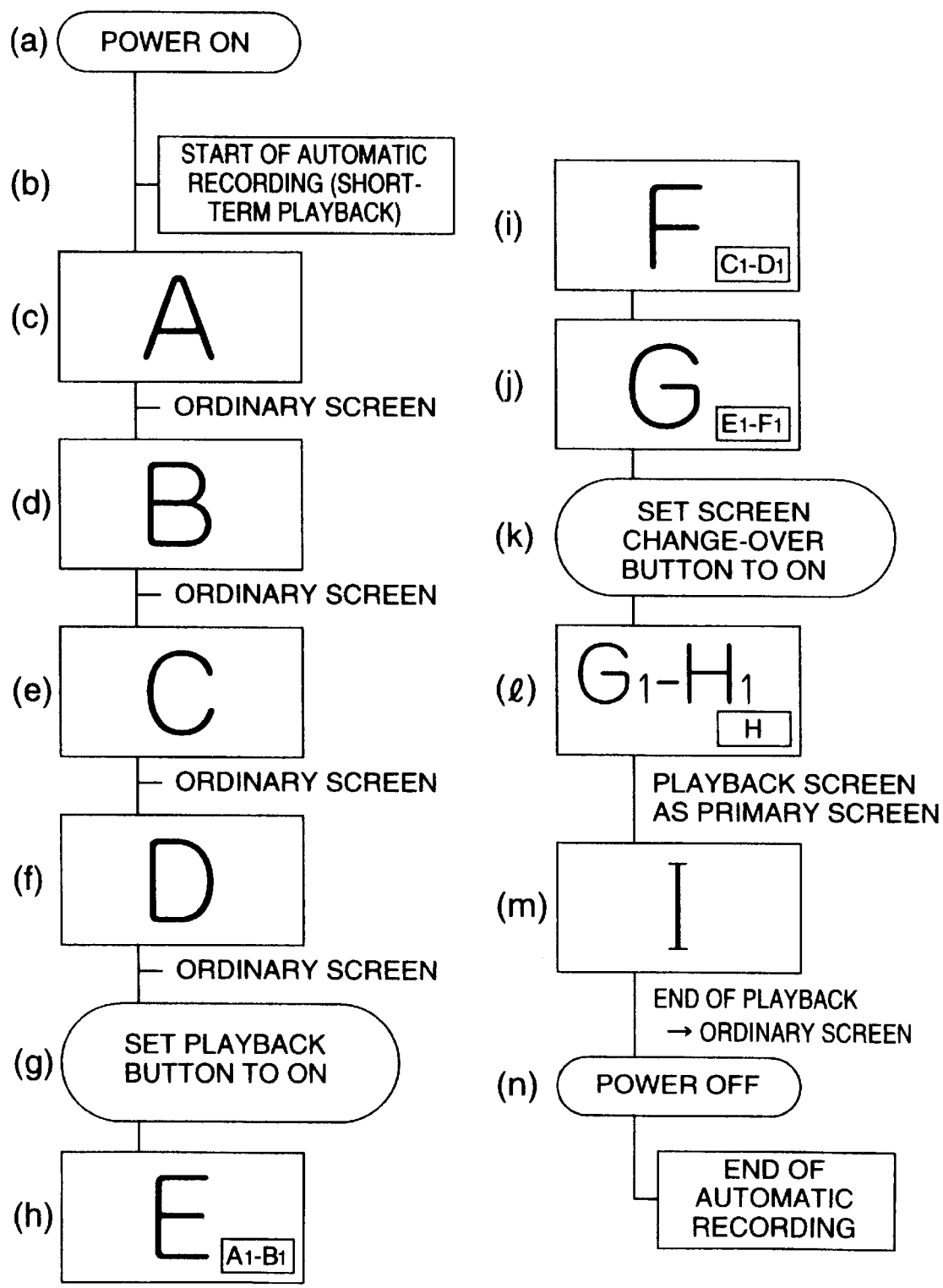
FIG. 13 is a diagram showing another concrete example of a sequence of screen images displayed in a short-term playback mode in the embodiment of FIG. 1.

FIG. 13 is a diagram for explaining another specific example of the short-term playback mode called a smooth playback mode.

In the short-term playback mode described by referring to FIG. 5, the playback image is "B" when the mode is finished and the ordinary screen image to be present is "E" which is advanced in time with respect to "B" as shown in (i) and (j) of FIG. 5. Particularly, when the playback picture is displayed as the primary screen image in the short-term playback mode, there occurs discontinuity in the screen display operation.

The smooth playback mode of FIG. 13 is provided to overcome the difficulty of discontinuity in the images presented on the screen. Assume that (a) to (f) of FIG. 13 are display states of the ordinary screen image when the power button (FIG. 4) described in association with FIG. 5 is depressed; moreover, when the playback button (FIG. 4) is operated in the state (FIG. 13(g)), the screen images of (c) to (f) of FIG. 13 are displayed as playback images of about ten seconds. The playback images are then presented together with the scenes of the television program in the picture-in-picture mode as shown in (h) to (k) of FIG. 13.

That is, in the short-term playback mode as already described in relation to FIG. 3, when the playback button (FIG. 4) is depressed, the read start address $A_{R1}$ is set to start the read operation of the semiconductor memory 14 beginning at the address $A_{R1}$. However, unlike in the specific example shown in FIG. 5, the read operation is conducted at an higher speed until the pertinent address is equal to write address $A_w$ in the smooth playback mode. In other words, the read operation is carried out beginning at the read start address $A_{R1}$ up to the moving write address $A_w$.

Assume that the read speed of the memory 14 is twice the write speed thereof and that a storage position of the memory 14 ten seconds before the point when the playback button (FIG. 4) is depressed is set as the read start address $A_{R1}$. The read address beginning at the address $A_{R1}$ arrives at the moving write address $A_w$ when ten seconds lapse thereafter. Namely, the short-term playback mode is set for ten seconds in this case.

To perform the operation above, the video signal read from the memory 14 at a read speed which is twice the write speed thereof is expanded by the expander circuit 15. From each frame thereof, the fields are extracted in a field-by-field manner and are then stored in the memory 16 to be process for the fast review and picture-in-picture display operation.

In this connection, assume for simplicity of explanation in FIG. 13 that video images A to H are respectively one-frame images and $A_1$, $B_1$, $C_1$, and $D_1$ are one-field images respectively of frame images A to D. As shown in (h) to (k) of FIG. 13, in the screen of the short-period playback mode, field images $A_1$ and $B_1$ are displayed in the subordinate screen when the frame image E is presented in the primary screen. When the frame image F is next displayed as the primary screen image, field images $C_1$ and $D_1$ are continuously presented in the subordinate screen. Thereafter, when the frame image G is presented as the primary screen image, field images $E_1$ and $F_1$ are continuously displayed in the subordinate screen. When the short-term playback mode is terminated with the successive presentation of $G_1$ and $H_1$, a picture "H" is being displayed as the image of the television program (FIG. 13(l)). Namely, the ordinary display operation begins at an image "I" following the image "H1" of the television program (FIG. 13(m)) and automatic recording is terminated by power off (FIG. 13(n)).

In this manner, the smooth playback mode is finished without any discontinuity between the displayed pictures such that the playback image is followed by the picture of the television program. Consequently, during the smooth playback mode, the user need not pay attention especially to the picture of the television program. Namely, the television program can be enjoyed only by continuously viewing the playback images. In the short-period playback mode of FIG. 5, when the user is paying attention to the playback images, there may be a chance that some scenes of the television programs are missed.

Thanks to the provision above, the picture-in-picture display of FIG. 13 need not be necessarily designated in the smooth playback mode. That is, the playback picture may be presented in the overall screen area.

In this regard, assume in FIG. 3A that the number of frames from the write address $A_w$ when the playback button (FIG. 4) is depressed to the read start address $A_{R1}$ is n, the number of frames from the current point to a point of time when the read address reaches the moving write address is n', and the one-frame read time of the memory 14 is obtained by multiplying a by (one-frame write time), where a<1. Then, the following relationship is satisfied.

$$a(n+n')=n'$$

Although the number of frames n is determined by the playback time, the display time of playback pictures can be arbitrarily selected by appropriately setting the read speed (value a). In the situation above, a=½ and hence n=n'.

In addition, the read speed is increased in the semiconductor memory 14 in the description above. However, when writing the picture in the memory 14, the recording of images (e.g. commercial message images) not directly related to the program may be inhibited so that the recorded pictures can be advantageously read therefrom in a reduced period of time due to the skipped images. Moreover, the high-speed read operation may be also conducted in the memory 14.

Incidentally, according to the embodiment, it is possible that the system supports either one of the short-term playback modes of FIGS. 5 and 13. Alternatively, both of these modes may be supported such that there is provided a function for the user to select either one thereof according to operation purposes. In such a case, for example, when the playback button (FIG. 4) is depressed once, the short-term playback mode of FIG. 5 (or the smooth playback mode of FIG. 13) is assumed; whereas, when the playback button is successively depressed twice, the smooth playback mode (or the short-term playback mode) is set for the operation. It is to be appreciated that there may be provided an operation key or button dedicated to the setting of the smooth playback mode.

In this regard, the embodiments have been described concretely using numeric values. However, the present invention is not restricted by the numeric values, namely, these numeric values can be appropriately determined in an arbitrary fashion. Additionally, for example, the period of time to be set in the short-term playback mode and smooth playback mode may be changed for each television program. For example, about ten seconds and one minute may be designated for the programs of sports and dramas, respectively. Since the user watching the television screen image can recognize the kind of television program, it may also be possible for the user to set the values of the period of time by using the remote controller 1. In addition, the remote controller may be provided with operation buttons respectively for the kinds of television programs such that the user depresses the pertinent button to set the playback period of time for each television program in the short-term playback mode and smooth playback mode.

Figure 14:
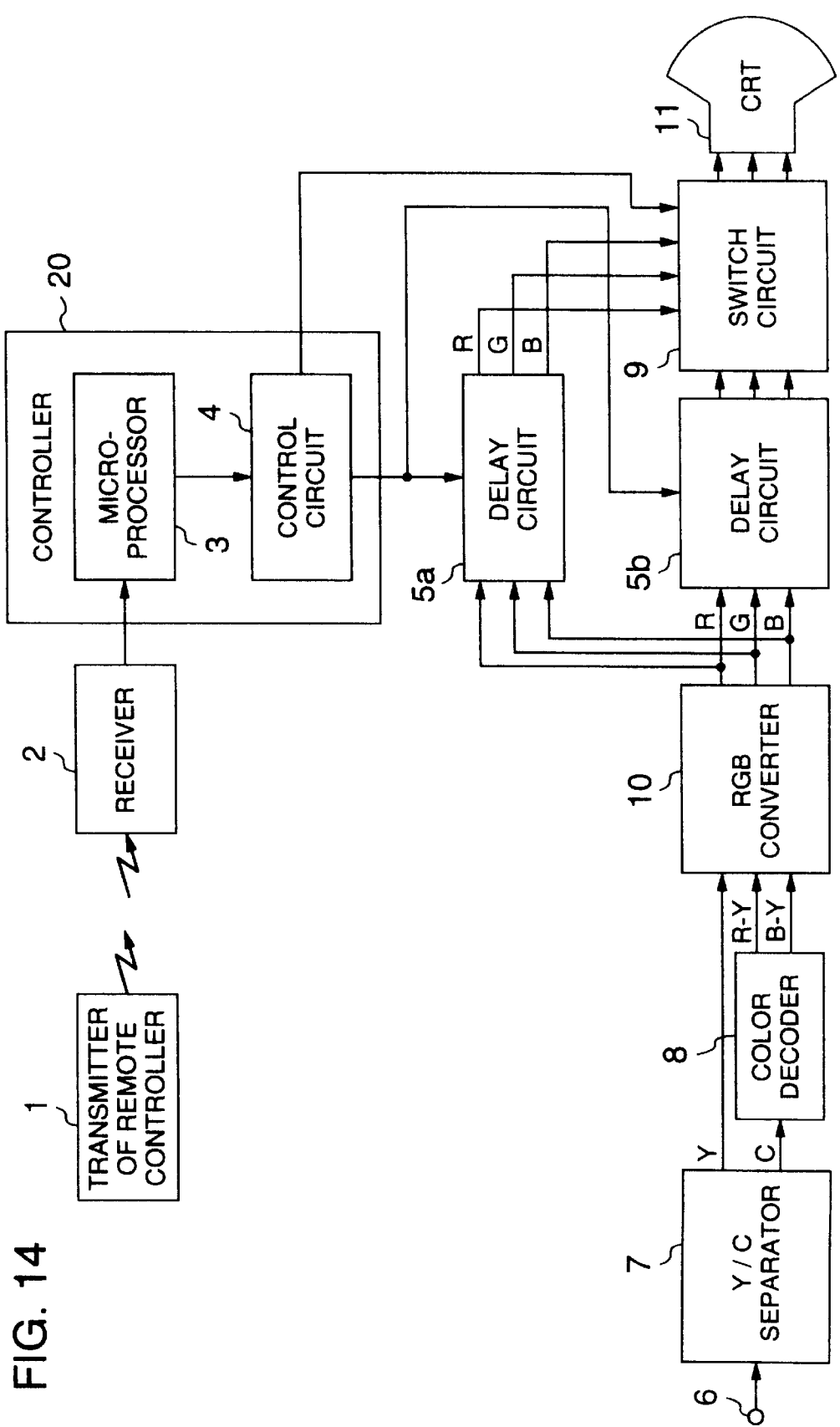
FIG. 14 is a block diagram showing the configuration of another embodiment of the television receiver and its display method according to the present invention.

Moreover, in the configuration of FIG. 1, the RGB converter 10 is disposed in a stage following the switch circuit 9 so as to store the luminance signal Y and color difference signals R - Y and B - Y in the storages 5a and 5b. However, as shown in FIG. 14, the RGB converter 10 may be arranged in a stage preceding the storages 5a and 5b to store the primary color signals R, G, and B in the storages 5a and 5b.

Figure 15:
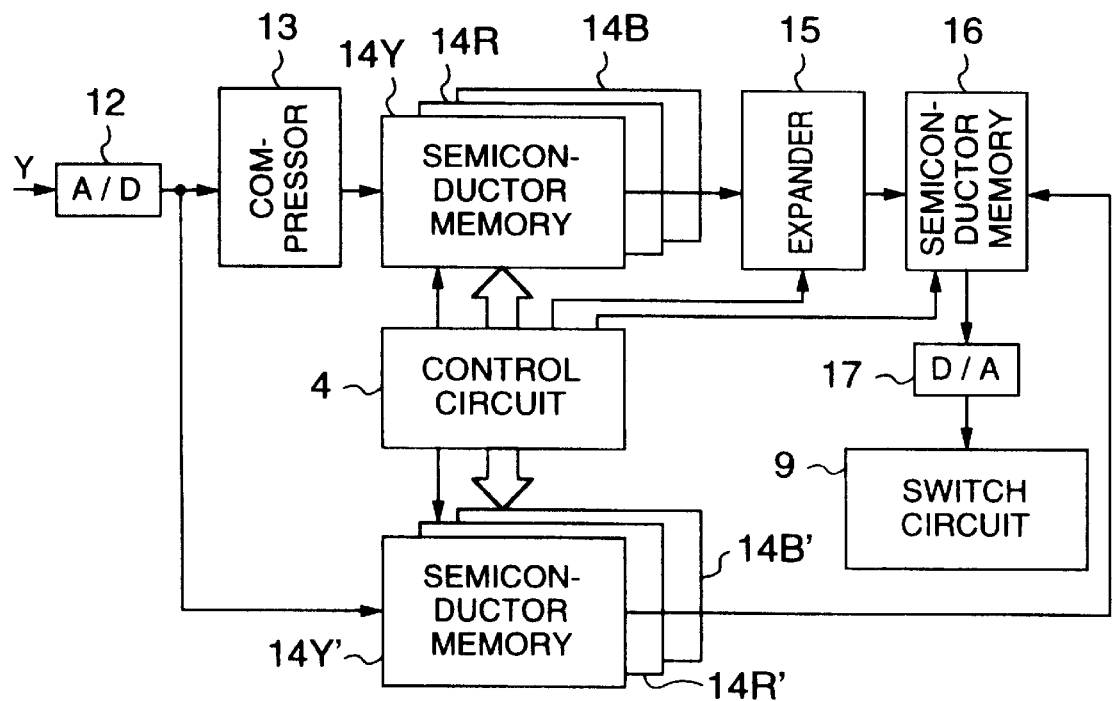
FIG. 15 is a block diagram showing the configuration of further another embodiment of the television receiver and its display method according to the present invention.

Additionally, according to the embodiment, the long-term and short-term playback processes and long-term and short-term time-shift processes are achieved using the same semiconductor memory 14. However, there may be provided as shown in FIG. 15 semiconductor memories 14Y', 14R', and 14B' in a separate fashion as compared with the configuration of FIG. 2 such that the long-term playback and time-shift processes are carried out using the memories 14Y, 14R, and 14B and the short-term playback and time-shift processes are effected in the memories 14Y', 14R', and 14B'. In this situation, the pictures not compressed are recorded in the memories 14Y', 14R', and 14B' for the playback thereof. Consequently, the quality of pictures obtained through the short-term playback and time-shift processes is remarkably improved.

According to the embodiments described above, any scenes missed during a television program can be immediately reviewed. Furthermore, even when there exists a fear of missing a portion of a television program, it is possible to record the pertinent portion by a simple operation so as to review the portion thereafter. Thanks to this provision, there is provided a television receiver efficiently satisfying the users' requirements.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

We claim:

1. A television receiver, comprising:
a video signal processing section for receiving as an input thereto a video signal and converting the signal into a video display signal;
video signal storage means for receiving the video display signal from the video signal processing section, recording the video display signal for a predetermined period of time, and writing the video display signal in an overwriting fashion after lapse of the predetermined period of time, thereby repeatedly recording the video display signal at an interval of the predetermined period of time;
composition switch means for receiving as inputs thereto the video display signals respectively outputted from the video signal processing section and the video signal storage means and combining the received signals with each other in a selective manner, and outputting a combined signal therefrom;
control means for controlling the video signal storage means and the composition switch means in response to an indication signal supplied from an external device and combining the video display signal from either one or both of the video signal storage means and the video signal processing section, thereby outputting the combined signal from the composition switch means; and
display means for displaying thereon the video display signal outputted from the composition switch means.

2. A television receiver according to claim 1, wherein the control means controls the composition switch means in response to the indication signal supplied from the external device and displays on the display means the video display signal outputted from the video signal processing section.

3. A television receiver according to claim 1, wherein the control means reads from the storage means, in response to the indication signal supplied from the external device, the video display signal ranging from the video signal at a point of time which is a predetermined playback time preceding a current time to the video signal at the current time and controls the composition switch means to display the video display signal from the video signal processing section in a primary screen and the video display signal from the video signal storage means in a subordinate screen disposed in the primary screen and vice versa.

4. A television receiver according to claim 1, wherein the control means reads from the storage means, in response to the indication signal supplied from the external device, the video display signal ranging from the video signal at a current time to the video signal at a point of time corresponding to an arbitrary specified playback period of time within a maximum storage period of time of the video display signal and controls the composition switch means to display the video display signal from the video signal processing section in a primary screen and the video display signal from the video signal storage means in a subordinate screen disposed in the primary screen and vice versa.

5. A television receiver according to claim 4, wherein the control means displays, in response to the indication signal supplied from the external device, the video display signal of an arbitrary specified time-shift period of time for the arbitrary playback display period of time in a thinning-out manner.

6. A television receiver according to claim 1, wherein the control means displays in response to the indication signal supplied from the external device, the video display signal from video signal processing means in a primary screen on the display means, continuously displays the video display signal stored in the video signal storage means at a current point in a still subordinate screen disposed in the primary screen, and displays in the subordinate screen, in response to the indication from the external device after lapse of an arbitrary time-shift period, the video display signal stored in the video signal storage means during a period of time ranging from the display of the still subordinate screen to a point of time corresponding to the lapse of the arbitrary time-shift period,
the control means alternatively displaying the video display signal of the video signal storage means in the primary screen and the video display signal of the video signal processing means in the subordinate screen.

7. A television receiver according to claim 1, wherein the control means specifies, in response to the indication signal supplied from the external device, the video display signal recorded in the video signal storage means in a period of time ranging from a current time to a point of time corresponding to a specified arbitrary time-shift period of time within a maximum storage period of time of the video display signal and controls the composition switch means after lapse of the specified time-shift period of time to display the video display signal from the video signal processing section in a primary screen and the video display signal from the video signal storage means in a subordinate screen disposed in the primary screen and vice versa.

8. A television receiver according to claim 5, wherein the control means displays, in response to the indication signal supplied from the external device, the video display signal of the arbitrary specified time-shift period of time for the arbitrary playback display period of time in the thinning-out manner,
the arbitrary display period of time being shorter than the predetermined time-shift period.

9. A display method for use with a television receiver, comprising the steps of:

displaying a television signal as an ordinary screen image;

storing, in concurrence with the ordinary screen display of the television signal, the television signal for a predetermined period of time repeatedly in an overwriting fashion;

displaying in a subordinate screen, during the ordinary screen display of the television signal, the stored television signal from a point of time which is a predetermined playback period of time preceding a current time to a point of the current time;

alternatively displaying the television signal ranging from the point related to the predetermined playback period of time to the current point in a primary screen and the ordinary screen image in the subordinate screen; and restoring the ordinary screen display of the television signal after displaying the television signal ranging from the point related to the predetermined playback period of time to the current point.

10. A display method for use with a television receiver, comprising the steps of:

display a television signal as an ordinary screen image;

storing, in concurrence with the ordinary screen display of the television signal, the television signal for a predetermined period of time repeatedly in an overwriting fashion;

specifying an arbitrary playback period of time preceding a current time within the predetermined period of time for the overwrite storage;

displaying in a subordinate screen, after lapse of the playback period of time during the ordinary screen display of the television signal, the stored television signal from a point of time which is a predetermined playback period of time preceding a current time to a point of the current time;

alternatively displaying the television signal ranging from the point related to the predetermined playback period of time to the current point in a primary screen and the ordinary screen image in the subordinate screen; and restoring the ordinary screen display of the television signal after displaying the television signal ranging from the point related to the predetermined playback period of time to the current point.

11. A display method for use with a television receiver according to claim 10, further including the step of specifying a playback display period of time shorter than the specified playback period of time and displaying the television signal corresponding to the playback period of time for the playback display period of time in a thinning-out manner.

12. A display method for use with a television receiver, comprising the steps of:

displaying a television signal as an ordinary screen image in a primary screen;

storing, in concurrence with the ordinary screen display of the television signal, the television signal for a predetermined period of time repeatedly in an overwriting fashion;

displaying, during the display of the ordinary screen image, the television signal stored for a predetermined time at an arbitrary point of time as a still picture in a subordinate screen;

displaying in the subordinate screen, at a time-shift point after the arbitrary point of time, the television signal stored for a predetermined time after the arbitrary point of time in association with the time-shift;

displaying alternatively the television signal stored for the predetermined time in a range from the arbitrary point of time to a current point in the primary screen and the ordinary screen image in the subordinate screen; and restoring the ordinary screen display after displaying the television signal stored for a predetermined time ranging from the arbitrary point of time to the time-shift point of time.

13. A display method for use with a television receiver, comprising the steps of:

displaying a television signal as an ordinary screen image in a primary screen;

storing, in concurrence with the ordinary screen display of the television signal, the television signal for a predetermined period of time repeatedly in an overwriting fashion;

specifying an arbitrary time-shift period of time associated with the predetermined period of time beginning at a current time;

displaying in a subordinate screen, after lapse of the time-shift period of time, within the ordinary screen image of the television signal, the television signal stored during the time-shift period of time in the overwriting fashion;

alternatively displaying the television signal stored in the overwriting fashion during the time-shift period of time in the primary screen and the ordinary screen image in the subordinate screen; and restoring the ordinary screen image of the television signal after displaying the television signal stored during the time-shift period of time.

14. A display method for use with a television receiver according to claim 11, further including the step of specifying the playback display period of time shorter than the predetermined period of time and displaying the television signal corresponding to the predetermined period of time for the playback display period of time in the thinning-out manner.

15. A display method for use with a television receiver according to claim 10, further including the steps of:

displaying the television signal stored in a period from the point of time related to the specified playback period of time to the current point of time in the primary screen and the ordinary screen display in the subordinate screen;

connecting, after the playback of the television signal of the specified playback period of time, a last television screen image of the playback period of time transitioning to a current ordinary screen image in the primary screen by using thinning-out screen images; and displaying the ordinary screen image in the primary screen after the primary screen display has undergone the thinning-out operation.

* * * * *

UNITED STATES PATENT AND TRADEMARK OFFICE
CERTIFICATE OF CORRECTION

PATENT NO. : 5,852,474

DATED : 22 December 1998

INVENTOR(S) : Nobufumi NAKAGAKI et al.

It is certified that error appears in the above-indentified patent and that said Letters Patent is hereby corrected as shown below:

| Column | Line | |
|--------|------|---|
| 11 | 23 | Change "Fig. 8(o)" to --Fig. 8(a)--. |
| 11 | 26 | Change "elated" to --related--. |
| 11 | 50 | Before "fed" delete "25". |

Signed and Sealed this

Twenty-eighth Day of September, 1999

Attest:

Q. TODD DICKINSON

Attesting Officer     Acting Commissioner of Patents and Trademarks